(No Model.) 2 Sheets—Sheet 1.
F. L. STRAW.
DITCHING OR ROAD MAKING MACHINE.
No. 535,028. Patented Mar. 5, 1895.
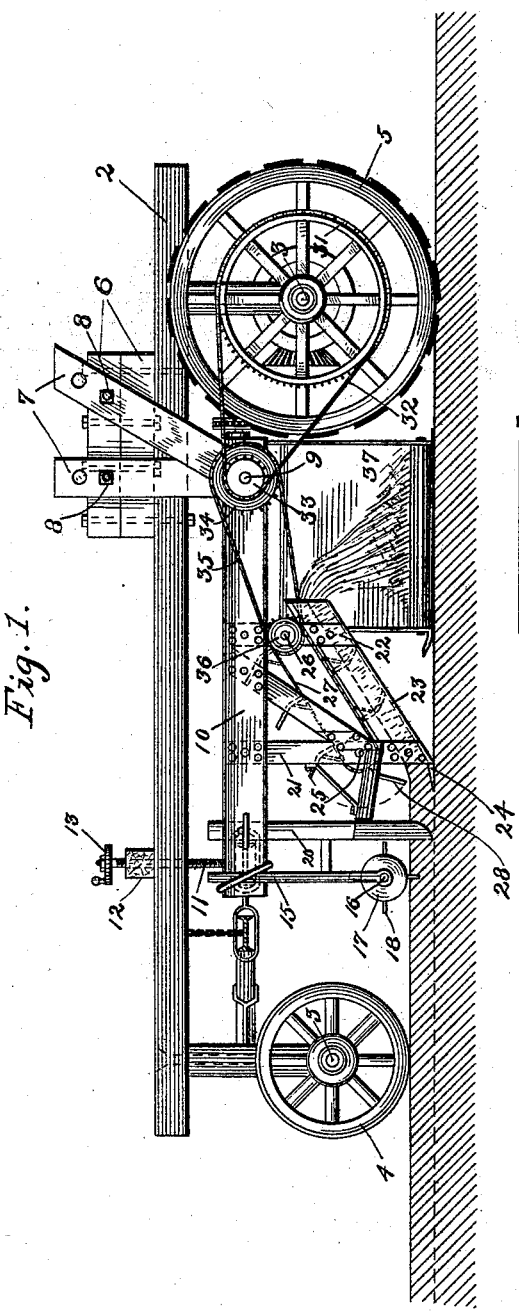
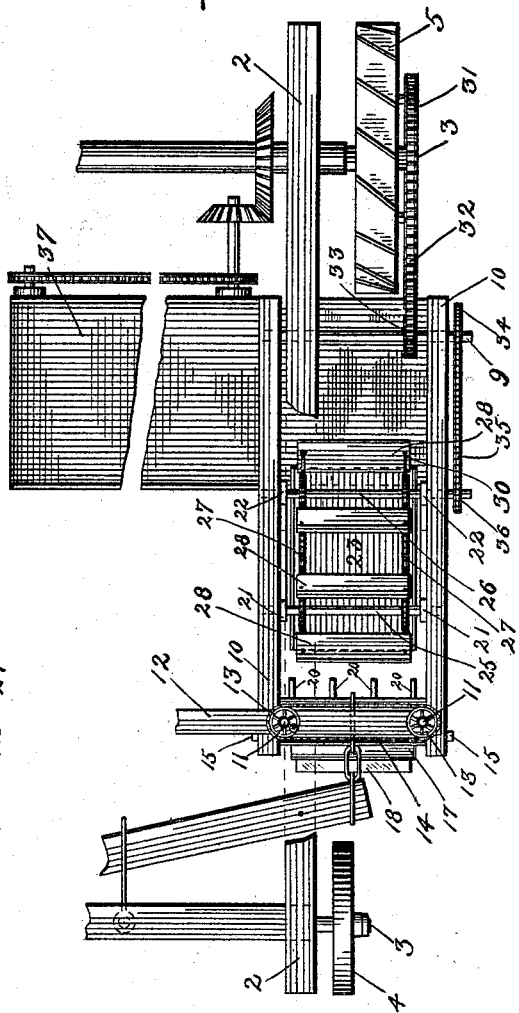
Witnesses:
Henry B. Avery.
Inventor:
Frank L. Straw.
By his attorneys.

(No Model.) 2 Sheets—Sheet 2.

F. L. STRAW.
DITCHING OR ROAD MAKING MACHINE.

No. 535,028. Patented Mar. 5, 1895.

Witnesses:
Henry B. Avery.

Inventor:
Frank L. Straw.
By Paul Hawley
his attorneys.

UNITED STATES PATENT OFFICE.

FRANK L. STRAW, OF MINNEAPOLIS, MINNESOTA, ASSIGNOR TO ANTOINETTE M. STRAW, OF SAME PLACE.

DITCHING OR ROAD-MAKING MACHINE.

SPECIFICATION forming part of Letters Patent No. 535,028, dated March 5, 1895.

Application filed July 27, 1894. Serial No. 518,736. (No model.)

*To all whom it may concern:*

Be it known that I, FRANK L. STRAW, of the city of Minneapolis, county of Hennepin, State of Minnesota, have invented certain new and useful Improvements in Ditching or Road-Making Machines, of which the following is a specification.

My invention relates to road-making or ditching machines, and the object which I have in view is to provide a machine with a large capacity for work, which will cut a wide furrow, and dispose of the dirt directly from the plow; and further, which shall be adjustable to various kinds of work.

My invention consists in general in a wheeled-frame, a pivoted frame carried thereby, means for adjusting the same, a long horizontal knife carried by said frame, an inclined trough leading therefrom, the same together constituting a plow, a conveyer provided with plates to operate in said trough, and a lateral conveyer to receive the dirt from said trough; and further my invention consists in vertically arranged knives or colters, and further, in a long bladed rolling colter or drum to cut the earth in advance of the vertical knives, all substantially as hereinafter described and particularly pointed out in the claims.

The invention will be more readily understood by reference to the accompanying drawings, forming part of this specification, and in which—

Figure 4:
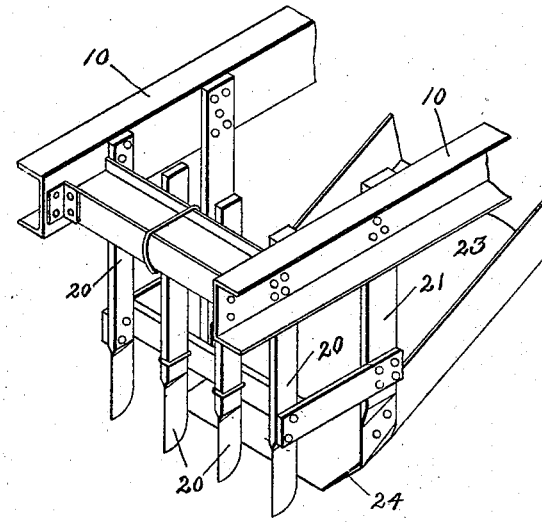
Figure 5:
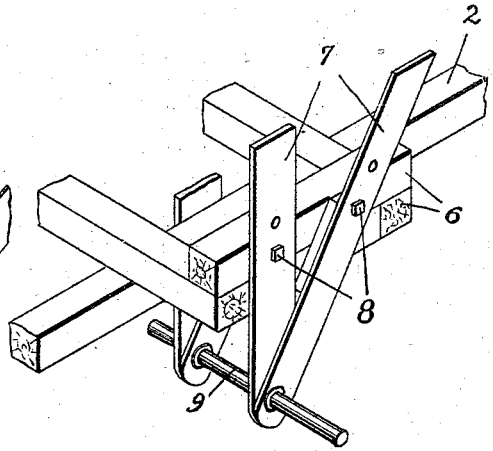
Figures 3, 6:
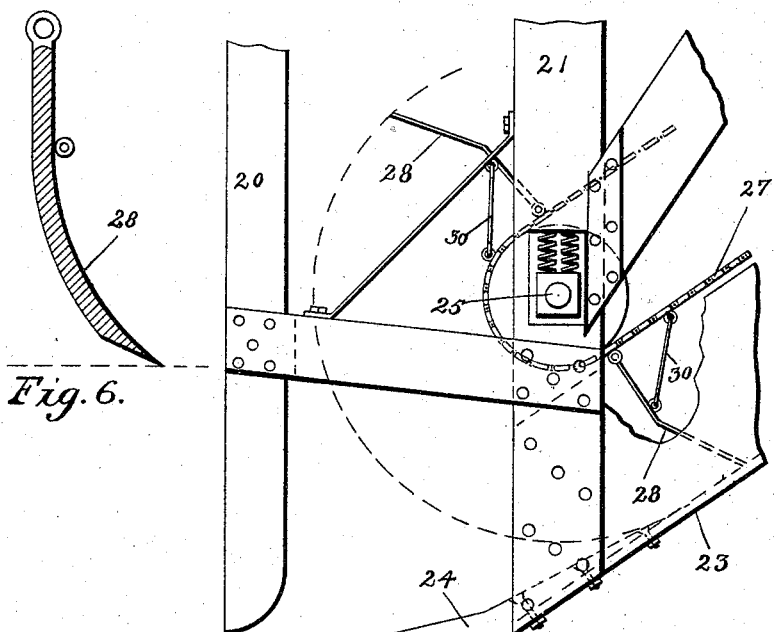
Figure 7:
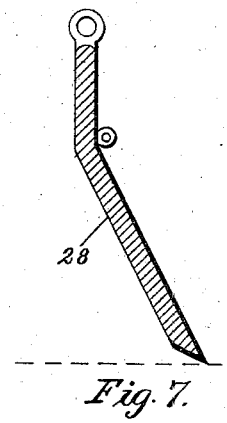

Figure 1 is a side elevation of a ditching and road making machine embodying my invention. Fig. 2 is a partial plan view thereof showing the novel construction. Fig. 3 is an enlarged detail side elevation of the forward and lower end of the plow showing the arrangement of the vertical cutters, and the construction of the traveling wings, blades or plates which operate in the trough of the plow. Fig. 4 is a smaller perspective view showing the plow and the vertical knives or colters. Fig. 5 is a perspective view showing the short shaft whereon the plow frame is pivoted. Figs. 6 and 7 are detail vertical sections of two forms of traveling blades which I may employ.

As shown in the drawings, 2 represents a suitable frame supported upon the axles 3 of the forward and rear trucks 4 and 5.

Upon the top of the frame I provide the cross-pieces and the blocks 6, whereon are secured the depending bracket straps 7, adjustable thereon by means of bolts 8. The lower ends of these bracket straps converge and in them the short shaft 9 is journaled. This shaft is of the necessary length to receive the adjustable plow frame made up of the longitudinal beams 10, the rear ends of which are loosely pivoted upon said shaft. The beams 10 are connected by suitable cross braces and the forward end of the frame is made adjustable by the use of the threaded spindles 11 having their lower ends secured in said beams and their upper ends in threaded blocks in the cross-beam 12. For operating these spindles simultaneously I preferably provide each with a sprocket wheel 13 and connect them by a belt 14. The draft connection with the plow frame may be of any desired construction.

Depending arms or bars 15 extend from the forward ends of the beams 10 being adjustably secured thereon, and in the lower ends of these arms a shaft 16 is journaled. On this shaft I arrange the long roller 17 provided with a knife or cutter blade 18 of substantially the same length and adapted to cut into the ground to loosen the same in advance of the vertical knives or colters 20. The shanks or upper ends of these knives are securely fastened upon the beams 10 and the cross-beam extending between them, and the lower ends of the knives are moreover braced against the depending bars 21 which extend down from an intermediate part of the adjustable frame. Back of these bars are the shorter depending bars 22, and between the pairs of bars I secure the inclined trough 23 preferably made of boiler iron. The plow share or long horizontal knife 24 is, as shown in Fig. 3, fastened securely to the lower edge of the trough.

25 and 26 represent shafts which have bearings in the opposite pairs of arms 21 and 22, each being provided with sprocket wheels to carry two or more sprocket belts 27. These belts operate at the inclination shown and at a considerable distance above the bottom of the plow trough. The wings, blades or plates 28 extend between the opposite belts 27 having their inner edges secured firmly thereon. The blades are preferably bent or curved backwardly and are securely held in the proper relations to the carrying belts by means of strong tie and brace links 30, connected to the middle parts of the blades and the chains respectively. The outer or lower edges of the blade are nicely sharpened, as shown in Figs. 6 and 7, in order that they may cut through the dirt, as will be hereinafter explained. These traveling blades are driven from the rear truck wheels, whereon I provide the large sprocket wheel 31 from which a belt 32 extends to the smaller sprocket wheel 33 on the shaft 9. Connected with this wheel is a larger one 34 from which a second sprocket belt 35 extends to a small wheel 36 provided on the shaft 26. A comparatively large number of revolutions of the belts 27 and the blades may thus be obtained from necessarily slow movement of the machine; and further, the plow frame may be raised or lowered without lengthening or shortening either of the belts.

37 represents a lateral conveyer extending from a point beneath the upper end of the inclined trough to a point beyond the side of the machine. Both the construction of this conveyer and the means for driving the same may be varied and are therefore not shown in detail.

The operation of my machine is as follows:—The machine is drawn slowly over the course and the plow-frame is lowered by means of the spindles which also act to force the plow and the colters into the ground. The share or wide knife 24 of the plow is set to cut at a depth of from three to eight inches, and as the machine is moved forward the roller knife colter and the upright knives quite thoroughly cut into and break up the surface of the ground. The plow share cuts or shaves off the upper layer of the ground and the same passes into the trough in the form of a wide slab or strip. The wide blades or plates 28 travel rapidly and as they are brought around and reach the forward ends of the carrying belts cut into and through the strip of earth in the trough, carrying the same upward in narrow sections to the top of the trough, where the dirt is precipitated upon the rapidly moving belts of the conveyer.

Having thus described my invention, I claim as new and desire to secure by Letters Patent—

1. The combination with the wheeled frame, of the plow frame beneath said wheeled frame, said plow frame having its rear end pivotally supported and its forward end vertically adjustable, an inclined trough carried by said plow frame, a knife secured to the lower edge of said trough, belts operating in said trough upon each side thereof, blades between said belts and secured thereto and adapted to carry the material excavated by said plow share up said inclined trough, and a lateral conveyer to receive the material from said trough, substantially as described.

2. The combination with the wheeled frame of the plow frame beneath said wheeled frame, said plow frame having its rear end pivotally supported and its forward end vertically adjustable, an inclined trough carried by said plow frame, a plow share 24 secured to the lower edge of the trough, belts 27 operating in said trough, the curved blades 28 extending between the belts 27 and secured thereto and arranged to convey the material excavated by said plow share up said inclined trough, a lateral conveyer to receive the material from said inclined trough, and means connecting said plow frame directly to the draft chain, substantially as described and for the purpose specified.

3. The combination, with the frame, of the trucks whereon the same is supported, the adjustable plow frame, the plow attached thereto, and consisting in the wide knife or share 24 and the inclined trough 23, the inclined belts 27 the wide sharp edged blades carried thereby and adapted to operate in said trough, means for driving said belts and therewith the blades from the truck, the rolling transverse knives, and the vertical knives arranged in advance of said share, and a lateral conveyer to receive the dirt from said trough, substantially as described.

4. The combination with the wheeled frame, of the adjustable plow frame beneath said wheeled frame, said plow frame being made up of the side pieces 10 and suitable cross beams, and having its rear end supported by brackets 7, vertically movable spindles 11 supporting the forward end of said plow frame, an inclined trough carried by said plow frame, a plow share 24 secured to the lower edge of the trough, belts 27 operating in said trough, and carrying blades 28, a lateral conveyer for receiving the material from said trough, and mechanism connecting said plow frame directly to the draft chain, substantially as described.

5. The combination, with the wheeled frame, of the adjustable plow frame beneath said wheeled frame and supported thereby, an inclined trough 23 carried by said plow frame, a long horizontal knife secured to the lower edge of said trough, shafts 25 and 26, means for driving said shafts from the wheels of the machine, each shaft being provided with sprocket wheels carrying belts 27, the curved blades 28 extending between the belts 27 and secured thereto, the tie links 30 connecting the middle part of the links and the belts respectively, the vertical knives arranged in advance of said share and means for raising and lowering the forward end of the plow frame, substantially as described.

In testimony whereof I have hereunto set my hand this 29th day of March, A. D. 1894.

FRANK L. STRAW.

In presence of—
A. C. PAUL,
C. G. HAWLEY.